US008749217B2

(12) United States Patent
Ye (10) Patent No.: US 8,749,217 B2
(45) Date of Patent: Jun. 10, 2014

(54) PRIMARY VOLTAGE SENSING AND CONTROL FOR CONVERTER (75) Inventor: Zhong Ye, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 77 days.

(21) Appl. No.: 13/332,599

(22) Filed: Dec. 21, 2011

(65) Prior Publication Data

US 2013/0003420 A1   Jan. 3, 2013

Related U.S. Application Data (60) Provisional application No. 61/502,533, filed on Jun. 29, 2011.

(51) Int. Cl.
G05F 1/00 (2006.01)
H02M 3/335 (2006.01)

(52) U.S. Cl.
USPC .............................. 323/283; 363/17

(58) Field of Classification Search
USPC .............................. 363/17; 323/283
See application file for complete search history.

(56) References Cited

U.S. PATENT DOCUMENTS

| 6,836,415 | B1 | 12/2004 | Yang et al. | |
|---|---|---|---|---|
| 7,054,170 | B2 | 5/2006 | Yang et al. | |
| 7,061,780 | B2 | 6/2006 | Yang et al. | |
| 2007/0071478 | A1* | 3/2007 | Hong | 399/88 |
| 2009/0058323 | A1 | 3/2009 | Yang | |
| 2012/0176824 | A1* | 7/2012 | Franklin et al. | 363/79 |
| 2012/0200331 | A1* | 8/2012 | Karlsson et al. | 327/175 |

OTHER PUBLICATIONS

"Digital PWM/PFM Controller with Input Voltage Feed-Forward for Synchronous Buck Converters," Applied Power Electronics Conference and Exposition, 2008, APEC 2008, pp. 523-528 (Zhang, et al.).
"Digital State Feedback Control and Feed-Forward Compensation for a Parallel Module DC-DC Converter using the Pole Placement Technique," Applied Power Electronics Conference and Exposition, 2008, APEC 2008, pp. 1722-1727 (Bae, et al.).
"Digital Load Current Feed-forward Control Method for a DC-DC Converter," Applied Power Electronics Conference and Exposition, 2008, APEC 2008, pp, 498-502 (Chae, et al.).
"Digital Predictive Feed-Forward Controller for a DC-DC Converter in Plasma Display Panel," IEEE Transactions on Power Electronics, vol. 23, No. 2, Mar. 2008, pp. 627-634 (Chae, et al.).

(Continued)

Primary Examiner — Adolf Berhane
Assistant Examiner — Emily P Pham
(74) Attorney, Agent, or Firm — William B. Kempler; Wade J. Brady, III; Frederick J. Telecky, Jr.

(57) ABSTRACT

A controller for a DC/DC converter can include a first error analog to digital converter (EADC) configured to detect a primary voltage from a secondary side of a transformer and generate a first error signal corresponding to the primary voltage. The first error signal is generated based on a comparison between a first reference voltage and the detected primary voltage. A first accelerator can be configured to process the first error signal and generate a first compensation signal that is a primary voltage variation signal used for feedforward control. A second EADC and a second accelerator can be configured to provide a output voltage feedback control. A compensation signal of the first accelerator can be used to scale the second accelerator output to facilitate fast feedforward control.

17 Claims, 6 Drawing Sheets (56) References Cited

OTHER PUBLICATIONS

"Feedforward Pulse Width Modulators for Switching Power Converters" IEEE Transactions on Power Electronics, vol. 12, No. 2, Mar. 1997, 361-368 (Arbetter, et al.).

"Design of a Digital PID Regulator Based on Look-Up Tables for Control of Hich-Frequency DC-DC Converters," IEEE Compel, 2002, pp. 18-21 (Prodic, et al.).

PCT Search Report mailed Dec. 20, 2012.

* cited by examiner

PRIMARY VOLTAGE SENSING AND CONTROL FOR CONVERTER

CROSS-REFERENCE TO RELATED APPLICATION

This application claims the benefit of U.S. Provisional Patent Application 61/502,533 filed on Jun. 29, 2011, entitled FAST PRIMARY VOLTAGE SENSING AND FEEDFORWARD CONTROL FOR DC/DC CONVERTER MODULE DESIGN, the entirety of which is incorporated by reference herein.

TECHNICAL FIELD

This disclosure relates to a systems and method to provide primary voltage sensing and control for converters.

BACKGROUND

Many intermediate bus converters (IBC) and almost all adaptive bus converters (ABC) supplying DC power at power levels above 200 W and with a size of ⅛ brick or larger have controllers on the secondary side of the converter due to system communication and pre-bias requirements. Due to physical size and cost restrictions however, bulky primary current transformers and expensive isolated linear voltage transceivers are rarely used. Thus, how to implement digital control without direct primary voltage and current sensing becomes a concern. Most existing solutions utilize an extra bias transformer winding and a sample-hold circuit to sense primary voltage. The voltage signal has to be filtered and even amplified before feeding to a digital controller. It usually requires several switching cycles for external circuits to respond while converter sensing and firmware interrupts may require additional time to process the voltage information before a modulated duty cycle can be adjusted. The slow signal sensing and control response does not allow the converters to have limited output voltage disturbances when input voltage surges occur. Too great of an output voltage disturbance can cause the converters to shut down.

SUMMARY

In one example, a controller for a DC/DC converter includes a first error analog to digital converter (EADC) configured to detect a primary voltage from a secondary side of a transformer and generate a first error signal corresponding to the primary voltage. The first error signal is generated based on a comparison between a first reference voltage and the detected primary voltage. A first accelerator can be configured as a feedforward control to process the first error signal and generate a first compensation signal based on a primary voltage variation from the first reference voltage.

In another example, a method includes monitoring a primary voltage of a DC/DC converter via a first error analog to digital converter (EADC) to generate a first error signal, wherein the first error signal is based on a comparison of a first reference signal and the monitored primary voltage. The method includes generating a first compensation signal based on the first error signal and monitoring an output voltage from the DC/DC converter via a second EADC to generate a second error signal, wherein the second error signal is based on a comparison of a second reference voltage and the monitored output voltage. The method includes generating a second compensation based on the second error signal, wherein the second compensation signal is combined with the first compensation signal to adjust the PWM duty cycle to regulate the DC/DC converter's output voltage. This includes combining the first compensation signal and the second compensation signal into a feedforward control to facilitate steady state operations of the DC/DC converter in one switching cycle.

In yet another example, a controller for a DC/DC converter includes a first error analog to digital converter (EADC) configured to detect a primary voltage from a secondary side of a transformer and generate a first error signal corresponding to the primary voltage, wherein the first error signal is generated based on a comparison between a first reference voltage and the detected primary voltage. The controller includes a first accelerator configured to process the first error signal and generate a first compensation signal that presents primary voltage variation from reference point and is utilized for feedforward control. This includes a second error analog to digital converter (EADC) configured to detect the DC/DC converter output voltage and generate a second error signal corresponding to the output voltage. The first error signal is generated based on a comparison between a second reference voltage and the detected output voltage. A second accelerator can be configured to process the second error signal and generate a second compensation signal that is fed-forward to the primary side of the transformer to control the primary voltage. The controller also includes a modulator to control switching elements within a primary side and the secondary side of the transformer. The controller can also include a combiner to feedforward the first compensation signal and the second compensation signal to the modulator in order to facilitate steady state operations of the DC/DC converter in one switching cycle.

DETAILED DESCRIPTION

Figure 1:
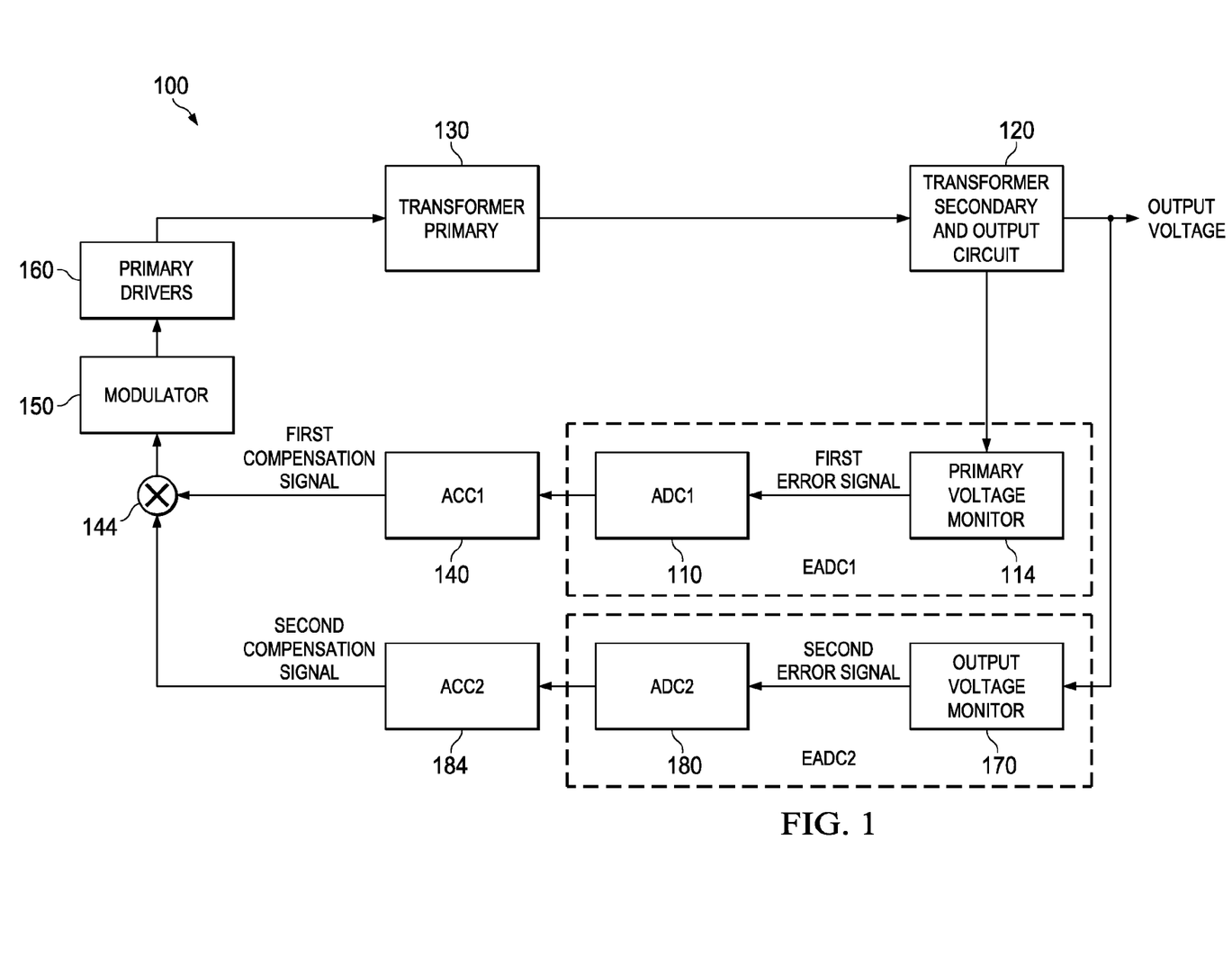
FIG. 1 illustrates an example of a converter that employs a controller to facilitate control of the converter.

FIG. 1 illustrates an example of a converter 100 the employs controls configured to facilitate control of a pulse width modulator (PWM) duty cycle. The controls in the example of FIG. 1 employ secondary side sensing and feedforward control of the converter 100. The DC/DC converter 100 can include a first analog to digital converter (ADC1) 110 configured to detect a primary voltage via a primary voltage monitor 114. The ADC 110 and primary voltage monitor are collectively referred to herein as the first error ADC (EADC1). The primary voltage monitor 114 monitors primary voltage from a secondary side of a transformer 120 and generates a first error signal corresponding to the primary voltage generated by a transformer primary 130 relative to a reference voltage (not shown).

A first accelerator 140 can be configured to process the first error signal and generate a first compensation signal that is fed-forward to a voltage control loop to minimize output voltage disturbances caused by input voltage changes and to regulate a stable output voltage. The accelerator 140 can be implemented as a hardware accelerator, such as a math co-processor, a field programmable gate array or other high speed programmable controller. As one example, the accelerator may be implemented as a control law accelerator, such as is commercially available from Texas Instruments Incorporated. As shown, the first compensation signal can be combined (e.g., multiplied) by a second compensation signal at 144 and fed-forward to a modulator 150 that drives primary drivers (e.g., switching circuits, such as field effect transistors) 160 to the transformer primary 130. The modulator 150 can also drive secondary drivers (e.g., switching circuits) in the transformer secondary 120.

An output voltage monitor 170 can be provided to monitor DC/DC converter output voltage and generate a second error signal based on the output voltage relative to a second reference (not shown). The output voltage monitor can provide the second error signal to a second ADC 180. The output voltage monitor 170 and the second ADC 180 are collectively referred to herein as the second error ADC (EADC2). A second accelerator (e.g., a hardware accelerator, such as a common law accelerator) 184, which is often called voltage loop compensator, processes the second error signal from the second EADC and generates the second compensation signal which is combined with the first compensation signal at 144 and fed-forward to the modulator 150.

The DC/DC converter 100 provides improved performance and stability over conventional converter models. Such improvements are realized by both feedback and feed-forward controls because the transformer primary and converter output voltages are directly sampled/detected by fast analog to digital converters and controllers as opposed to a conventional converter with a single feedback control loop. Although referred to herein as an ADC at 110 and at 180, substantially any analog to digital converter can be employed that can suitably respond to the DC/DC converter output voltage and transformer primary input voltages. Similarly, the accelerators at 140 and at 184 can be any controller that is fast enough to respond to circuit design constraints (e.g., achieve transient startup settling within one switching cycle). The first EADC measures primary voltage cycle by cycle and compares it with a steady state reference value. The difference is digitized and fed to a downstream accelerator 140, which can be configured as a linear or non-linear amplifier. The accelerator's output can be utilized to scale a duty cycle of a pulse width modulator (PWM) (e.g., digital pulse width modulator (DPWM)) 150, which can maintain similar Volt*Second (volt/seconds) at the transformer output and minimize output voltage disturbances. The second loop, which is voltage feedback control loop. provided by the second EADC further establishes base-line stability and control in the DC/DC converter 100 by providing fast response and control to output load changes.

The first accelerator 140 can include a proportional and integral (PI) control to generate the first compensation signal. This can include a dynamic gain adjustment on the proportional control such as to modify the first compensation signal as disclosed herein with respect to FIG. 2. The dynamic gain adjustment can include positive or negative step controls to increase or decrease the first compensation signal. The primary voltage monitor 114 can include a first differential amplifier (not shown) to monitor the primary voltage and generate the first input error signal to the first EADC 110. The primary voltage monitor 114 can also include a first digital to analog converter (DAC) (not shown) to supply a first reference voltage for the first differential amplifier.

As shown, the second EADC can be configured to detect an output voltage of the DC/DC converter 100 and generate the second error signal corresponding to the output voltage. The second accelerator 184 processes the second error signal and generates the second compensation signal that is the feedback compensation output. The first compensation signal and the second compensation signal can be combined at 144 to adjust a digital pulse width modulator (DPWM), for example, via modulator 150 that controls switching elements to the primary side of the transformer 130 via the primary drivers 160. The second accelerator 184 can include a proportional, integral, and derivative (PID) controls to generate the second compensation signal. A second differential amplifier (not shown) can monitor the output voltage of the DC/DC converter 100 and generate a second input error signal to the second EADC. The DC/DC converter 100 can also include a second digital to analog converter (DAC) to supply a second reference voltage for the second differential amplifier.

Figure 2:
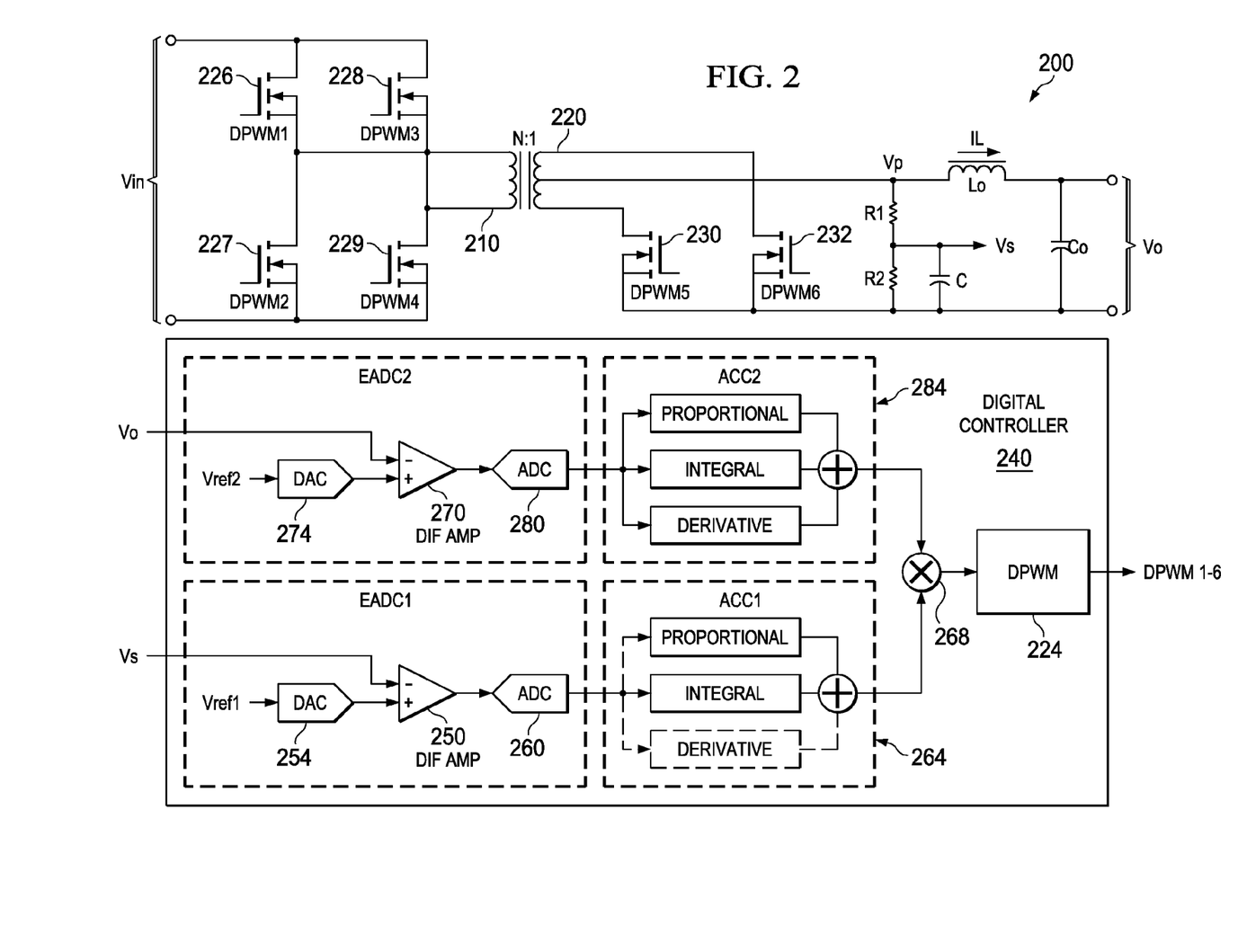
FIG. 2 illustrates an example DC/DC converter circuit showing a digital controller to facilitate control of the converter.

FIG. 2 illustrates an example DC/DC converter circuit 200 showing digital controller components that facilitate fast sensing of primary voltages. The converter circuit 200 includes a transformer primary 210 and transformer secondary 220 that are respectively driven by a digital pulse width modulator (DWPM) 224 having outputs DWPM 1 through 6. As shown, outputs DPWM 1-4 drive switches 227-229 in the primary 210 in conjunction with the input voltage Vin, whereas outputs DWPM 5 and 6 drive switches 230 and 232 in the transformer secondary 220. Primary voltage is sensed across resistors R1 and R2 where voltage Vs is utilized for sense and control of the primary voltage. Inductor Lo provides filtering for the output of the circuit 200 represented as Vo. Capacitors C and Co provide additional filtering for the converter circuit 200. As shown, the output voltage Vo and primary sense voltage Vs are input to a digital controller 240.

The voltage Vs is sampled by differential amplifier 250 having a digital to analog converter (DAC) 254 providing a first reference voltage. Output of the differential amplifier 250 is sampled by an analog to digital converter (ADC) 260 (Note: EADC1 of FIG. 1 is combination of differential amplifier 250, DAC 254, and ADC 260) which feeds accelerator 264 and which drives a combiner (e.g., multiplier) 268 to the input of the DPWM 224. As shown, the accelerator 264 includes a proportional and integral control with the derivative control shown as a dotted line to indicate its inactive operating state. The proportional and integral control can be summed before the input to the multiplier 268.

The voltage Vo is sampled by differential amplifier 270 having a digital to analog converter (DAC) 274 providing a second reference voltage. Output of the differential amplifier 270 is sampled by an analog to digital converter (ADC) 280 which feeds accelerator 284 and which drives the multiplier 268 to the input of the DPWM 224. For example, EADC2 of FIG. 1 can include a combination of differential amplifier 270, DAC 274, and ADC 280. As shown in FIG. 2, the accelerator 284 includes proportional, derivative, and integral controls which are summed before being input of the multiplier 268.

The digital controller 240 can be optimized for power converter control and can provide two or more digital loops. One of the loops (controlled by EADC2/ACC2) can be utilized for voltage output loop control. Another digital loop (controlled by EADC1/ACC1) can be used for primary voltage sensing and feedforward control. Since each EADC can operate at a high sampling rate, such as 16 Mega-samples per second (MSPS) for example, it can capture the power transformer's secondary winding voltage 220 at the plateau of output pulses. The pulse amplitude can be calculated by adding the EADC error output with a voltage reference value, Vref1, namely Vin=N*Ks*(EADC output+Vref1), where N is the transformer turn ratio and Ks=R2/(R1+R2). In order to measure Vin before power the stage is started, a Single-Frame Mode is introduced as described below with respect to FIG. 3.

Figure 3:
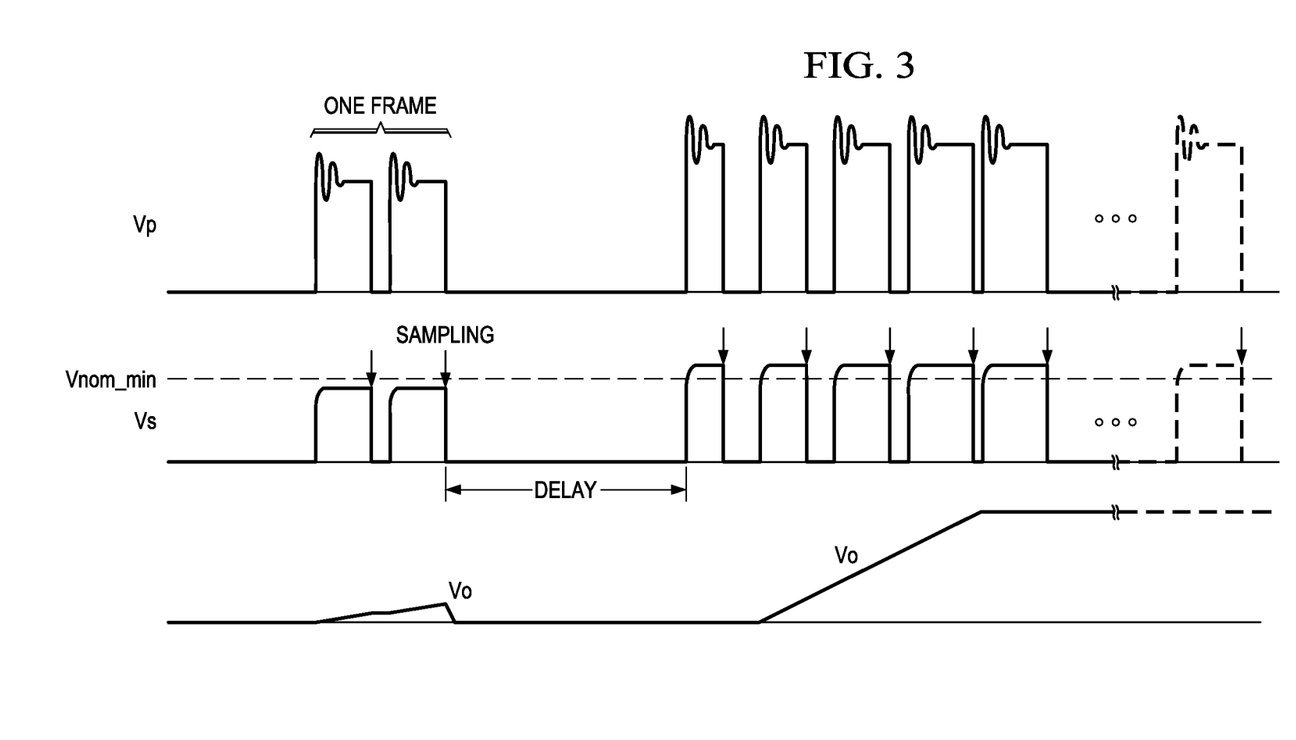
FIG. 3 illustrates an example signal diagram depicting startup voltages and timing for the DC/DC converter illustrated in FIG. 2.

FIG. 3 illustrates an example signal diagram depicting startup voltages and timing for the DC/DC converter illustrated in FIG. 2. The digital controller described above with respect to FIG. 2 can be configured to operate at Single-Frame Mode and to enable the power stage for one complete switching cycle, as shown in FIG. 3. Within this startup trial switching cycle, primary voltage can be measured and the controller can determine if the power stage should be started or not. Peak current mode can be used for feedforward control. It responds to an input voltage surge by maintaining current's peak value. However, the controller subsequently causes the output inductor's (e.g., demonstrated as Lo in FIG. 2) Volt*Second imbalance in several following switching cycles. This imbalance can result in a large current disturbance before the current reaches a new steady state and the voltage loop starts to respond, as shown in FIG. 4.

Figure 4:
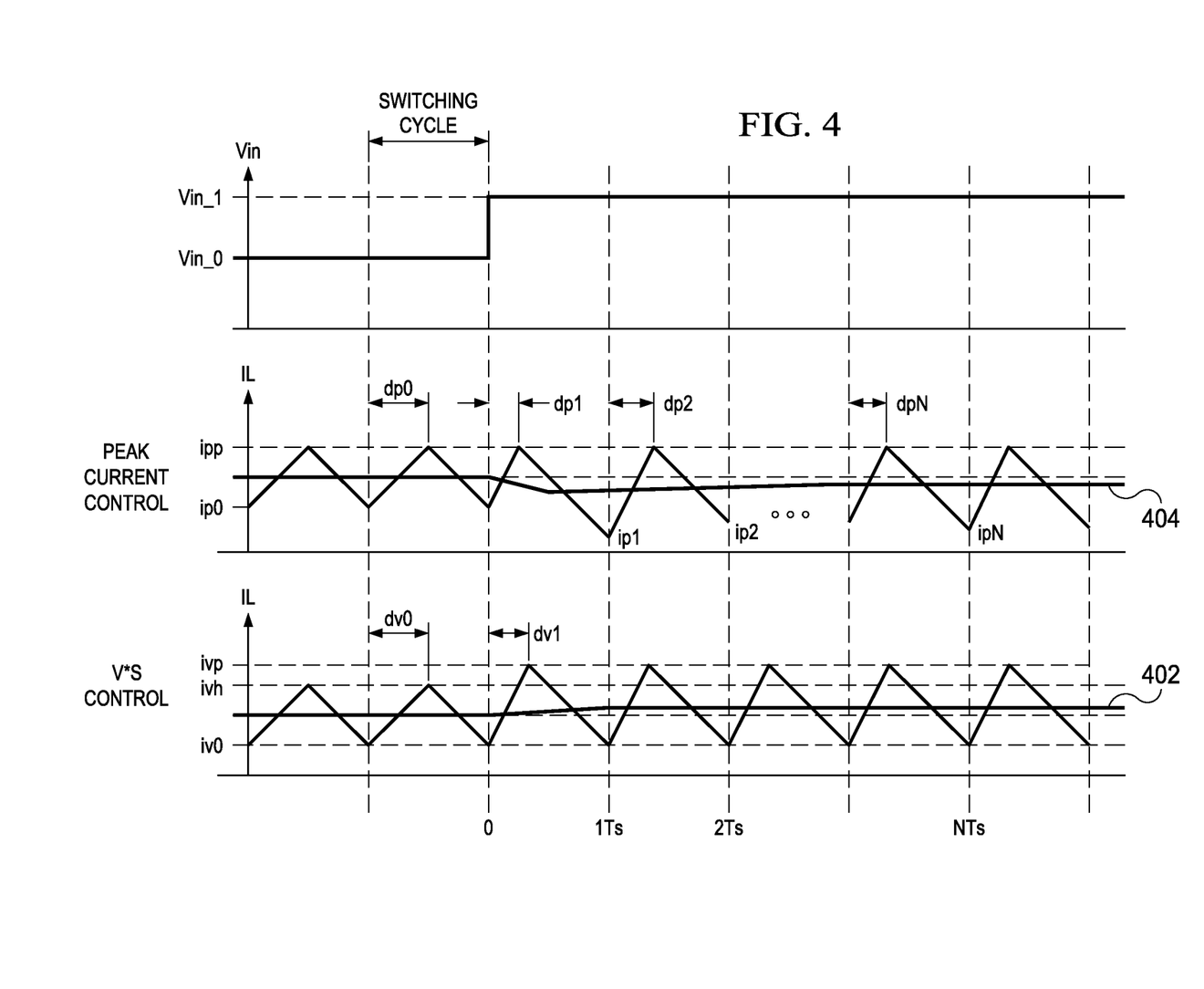
FIG. 4 illustrates an example signal diagram depicting output current response and timing for the DC/DC converter illustrated in FIG. 2.

FIG. 4 illustrates an example signal diagram depicting output current response and timing for the DC/DC converter illustrated in FIG. 2. As shown, at time t=0, the input voltage Vin increases (e.g., a surge) from Vin_0 to Vin_1. In contrast to Peak Current Mode (PCM) control, which takes several switching cycles, the controller depicted in FIG. 2 employs feedforward control to maintain substantially the same Volt*Second at transformer output and forces output current, IL, to drive into a new steady state in approximately one switching cycle. As demonstrated in FIG. 4, the feedforward control and peak current mode control have about the same steady state current offset absolute value, indicated at 402 and 404, respectively, before Vin increases. Additionally, following the voltage loop response, which takes significantly longer for the PCM control than the V*S control, the steady state currents 402 and 404 are also the same but in opposite directions (the absolute values at steady state are the same). To maintain about the same Voltage*Second at power transformer output before and after Vin surges, the new duty cycle Dv1 may be as follows:

$$Dv1 = Dv0 * [1 - \Delta Vp/(Vp0 + \Delta Vp)] \quad \text{Equation (1)}$$

where
Vp is transformer output voltage amplitude,
$\Delta Vp$ is the Vp increment, and
Dv0 is the duty cycle before Vin surge.

The "$1-\Delta Vp/(Vp0+\Delta Vp)$" portion of Equation 1 can be a feedforward scale and in PID form it can be expressed as follows:

$$\begin{aligned} PID \text{ Output} &= -\Delta Vs[1/(Ks * Vin\_0/N + \Delta Vs)] + \\ &\quad 0/s + 0*s + 1 \\ &= e * [1/(KAFE * Ks * Vin\_0/N - e)] + \\ &\quad 0/s + 0*s + 1 \end{aligned} \quad \text{Equation (2)}$$

where
KAFE is EADC gain, and
e is the EADC output.

Also, $1/(KAFE*Ks*Vin\_0/N-e)$ is the proportional gain and the constant "1" is integral branch's initial value. The proportional gain can be calculated and preprogrammed to a non-linear table of the first accelerator 264 of FIG. 2. The computation can be implemented by using one PID-based accelerator, as shown in FIG. 5.

Figure 5:
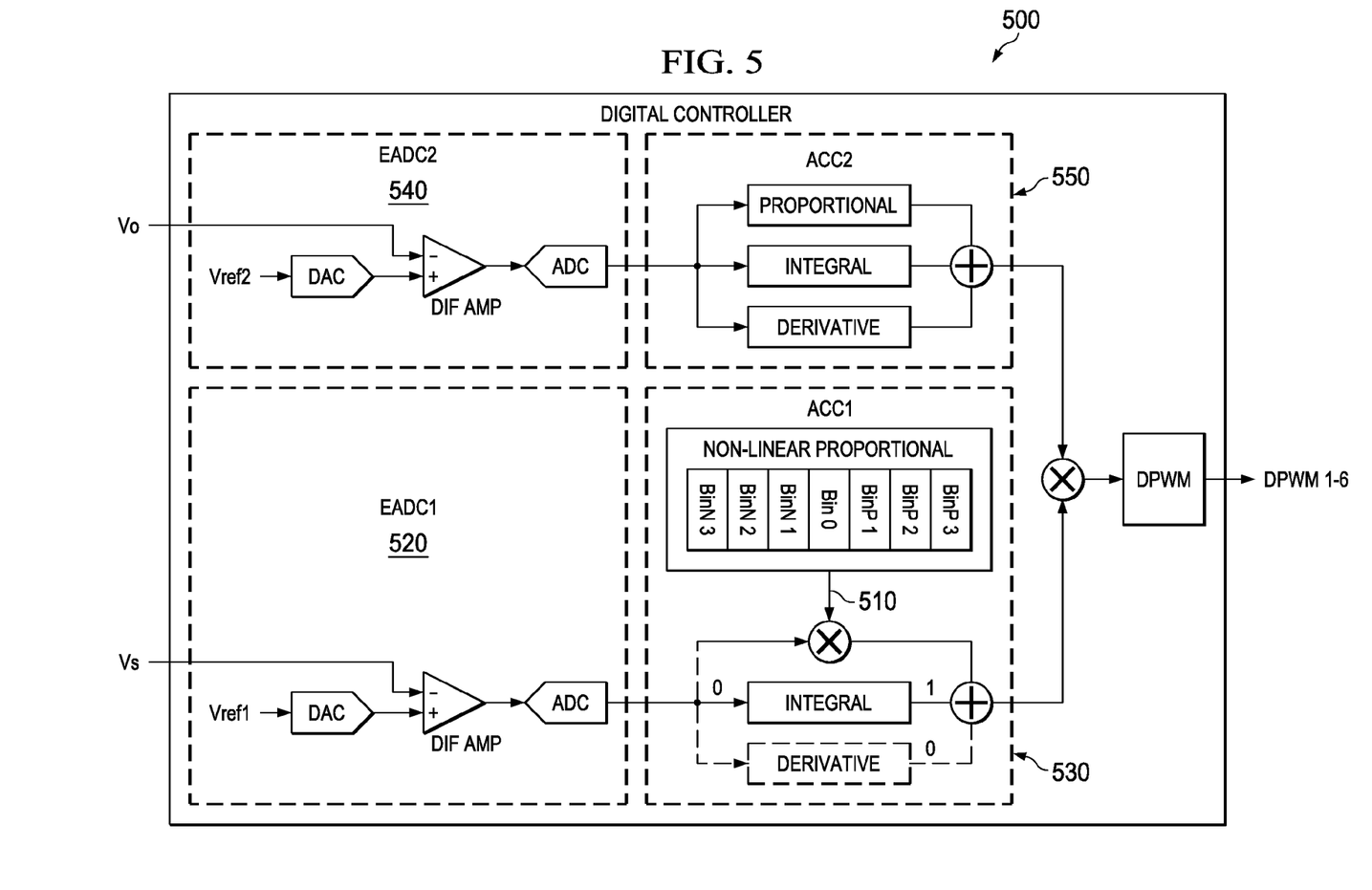
FIG. 5 illustrates another example of a digital controller with dynamic gain adjustment to facilitate control of primary voltages.

As a further example, FIG. 5 illustrates a digital controller 500 that can be implemented to facilitate fast control of a converter. In this example, the digital controller 500 includes an accelerator 530 that employs non-linear proportional control is illustrated at 510, where Bin represents binary step adjustments and P represents positive steps and N represents negative steps. Such steps can be incremented dynamically (automatically and during differing periods of operation of the digital controller 500) to adjust the proportional gain of the primary voltage controller EADC1 at 520 and accelerator 1 (ACC1) at 530. For example, a main controller or processor can provide instructions to the accelerator 530 to increment the proportional gain in this manner. As shown, an output voltage controller can provide a second control loop utilizing EADC2 at 540 and accelerator 2 (ACC2) at 550, such as disclosed with respect to FIG. 2. The ACC1 at 530 is shown at steady state operations where the value for the derivative control output is zero and the value of the integral control output is one.

Figure 6:
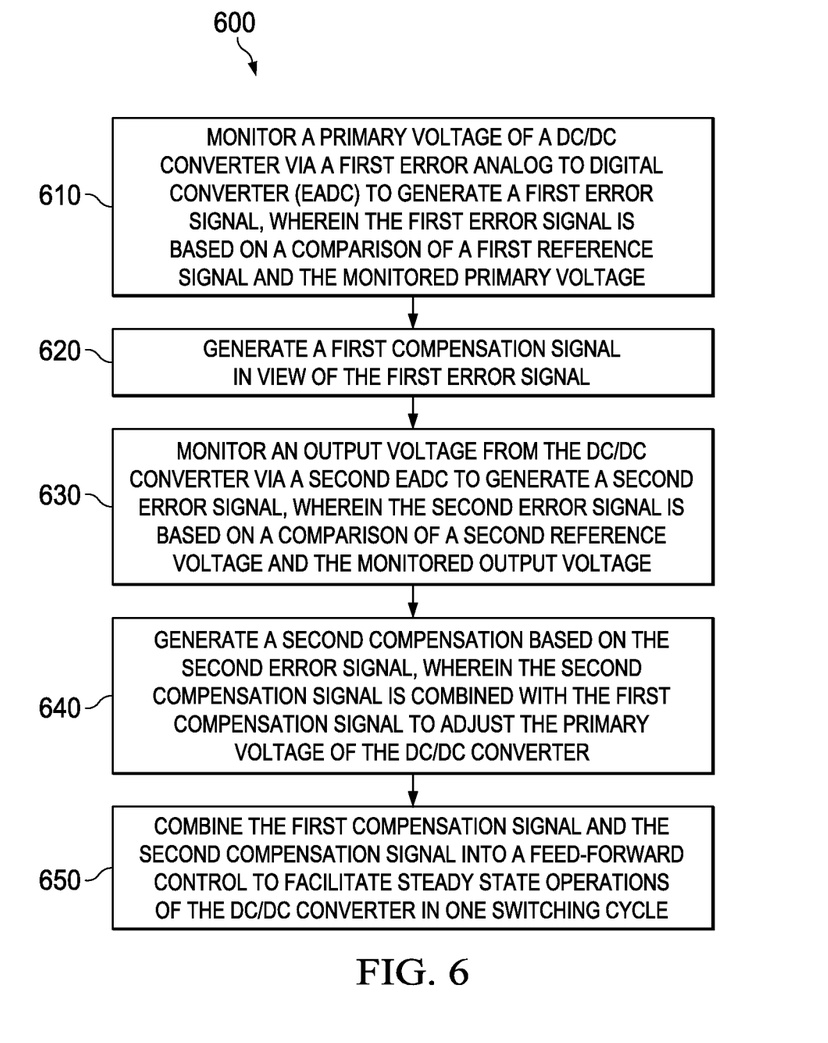
FIG. 6 illustrates an example method to facilitate control of a DC/DC converter.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC or a controller, for example.

FIG. 6 illustrates a method 600 that employs feedforward control to facilitate fast sensing of primary voltages. The method 600 includes monitoring a primary voltage of a DC/DC converter via a first error analog to digital converter (EADC) to generate a first error signal, wherein the first error signal is based on a comparison of a first reference signal and the monitored primary voltage at 610. At 620, the method 600 includes generating a first compensation signal based on the first error signal (e.g., via the accelerator ACC1 264 of FIG. 2). At 630, the method 600 includes monitoring an output voltage from the DC/DC converter via a second EADC to generate a second error signal, wherein the second error signal is based on a comparison of a second reference voltage and the monitored output voltage. At 640, the method 600 includes generating a second compensation based on the second error signal (e.g., via the accelerator ACC2 284 of FIG. 2). At 650, the method 600 includes combining (e.g., multiplying) the first compensation signal and the second compensation signal to provide both feedback and feedforward control to facilitate steady state operations of the DC/DC converter, such as within one switching cycle. For example, the combined signal can be employed to implement pulse width modulation that can driver a primary driver, a secondary driver or both, such as disclosed with respect to FIG. 2. Although not shown in FIG. 6, the method 600 can also include dynamically adjusting a proportional control associated with the first compensation signal. This can include applying positive or negative gain steps to adjust the proportional control in a non-linear manner (e.g., via non-linear proportional control 510 from FIG. 5). This can also include applying a proportional, integral, and derivative (PID) control to adjust the second compensation signal.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A controller for a DC/DC converter, comprising:
a first error analog to digital converter (EADC) configured to detect a primary voltage from a secondary side of a transformer and generate a first error signal corresponding to the primary voltage, the first error signal being generated based on a comparison between a first reference voltage and the detected primary voltage; and
a first accelerator configured as a feedforward control to process the first error signal and generate a first compensation signal based on a primary voltage variation from the first reference voltage;
further comprising a second error analog to digital converter (EADC) configured to detect an output voltage of the DC/DC converter and generate a second error signal corresponding to the output voltage, wherein the second error signal is generated based on a comparison between a second reference voltage and the detected output voltage;
a second accelerator configured to process the second error signal and generate a second compensation signal that is fedback to the primary side of the transformer to control the output voltage, wherein the first compensation signal and the second compensation signal are combined to adjust a pulse width modulator (PWM) that controls switching elements to the primary side of the transformer.

2. The controller of claim 1, wherein the first accelerator includes a proportional and integral (PI) control to generate the first compensation signal.

3. The controller of claim 2, wherein the PI control further comprises a proportional control that includes a dynamic gain adjustment to modify the first compensation signal.

4. The controller of claim 3, wherein the dynamic gain adjustment includes positive or negative step controls to increase or decrease the first compensation signal.

5. The controller of claim 1, wherein the first EADC further comprises a first differential amplifier to monitor the primary voltage and generate the first error signal.

6. The controller of claim 5, further comprising a first digital to analog converter (DAC) to supply the first reference voltage for the first differential amplifier.

7. The controller of claim 1, wherein the second accelerator includes a proportional, integral, and derivative (PID) control to generate the second compensation signal.

8. The controller of claim 1, further comprising a second differential amplifier to monitor the output voltage of the DC/DC converter and generate the second error signal.

9. The controller of claim 8, wherein the first EADC enables a power stage for one complete switching cycle of the DC/DC converter.

10. A method, comprising:
monitoring a primary voltage of a DC/DC converter via a first error analog to digital converter (EADC) to generate a first error signal, the first error signal being based on a comparison of a first reference signal and the monitored primary voltage;
generating a first compensation signal based on the first error signal;
monitoring an output voltage of the DC/DC converter via a second EADC to generate a second error signal, wherein the second error signal is based on a comparison of a second reference voltage and the monitored output voltage;
generating a second compensation signal based on the second error signal, wherein the second compensation signal is combined with the first compensation signal to adjust the primary voltage of the DC/DC converter; and
combining the first compensation signal and the second compensation signal into a control loop to facilitate steady state operations of the DC/DC converter in one switching cycle.

11. The method of claim 10, further comprising dynamically adjusting a proportional control associated with the first compensation signal.

12. The method of claim 11, further comprising applying positive or negative gain steps to adjust the proportional control.

13. The method of claim 10, further comprising applying a proportional, integral, and derivative (PID) control to adjust the second compensation signal.

14. A controller for a DC/DC converter, comprising:
a first error analog to digital converter (EADC) configured to detect a primary voltage from a secondary side of a transformer and generate a first error signal corresponding to the primary voltage, wherein the first error signal is generated based on a comparison between a first reference voltage and the detected primary voltage;
a first accelerator configured to process the first error signal and generate a first compensation signal that is the primary voltage variation;
a second error analog to digital converter (EADC) configured to detect an output voltage of the DC/DC converter and generate a second error signal corresponding to the output voltage, wherein the first error signal is generated based on a comparison between a second reference voltage and the output voltage of the DC/DC converter;
a second accelerator configured to process the second error signal and generate a second compensation signal that is for voltage loop feedback control;
a modulator to control switching elements within a primary side and the secondary side of the transformer; and
a combiner to feedforward the first compensation signal and the second compensation signal to the modulator in order to facilitate steady state operations of the DC/DC converter in one switching cycle.

15. The controller of claim 14, wherein the first accelerator includes a proportional and integral (PI) control to generate the first compensation signal.

16. The controller of claim 15, wherein the PI control further comprises a proportional control that includes a dynamic gain adjustment to modify the first compensation signal.

17. The controller of claim 14, wherein the second accelerator includes a proportional, integral, and derivative (PID) control to generate the second compensation signal.

* * * * *